United States Patent [11] 3,545,631

| [72] | Inventors | Wallace W. Mojden<br>Palos Heights;<br>Norman J. Chivas, Naperville, Illinois |
|------|-----------|------|
| [21] | Appl. No. | 825,096 |
| [22] | Filed | April 16, 1969<br>A continuation-in-part of Ser. No.<br>703,303, Feb. 6, 1968, abandoned. |
| [45] | Patented | Dec. 8, 1970 |
| [73] | Assignee | Fleetwood Systems, Inc.<br>Lyons, Illinois<br>a corporation of Illinois |

[54] CAN END TRANSFER APPARATUS
4 Claims, 15 Drawing Figs.

[52] U.S. Cl. ............................................. 214/6,
271/12, 271/30, 271/74, 214/8.5
[51] Int. Cl. .............................................. B65g 57/04,
B65g 59/04
[50] Field of Search ........................................ 214/6(D),
6(K), 6(H), 6(FS), 6(DS), 6(S), 8.5(D), 8.5(E),
309; 271/86, 68, 74, 11, 12, 5, 26, 30

[56] References Cited
UNITED STATES PATENTS

| 2,497,149 | 2/1950 | Berdis et al. | 214/6(D)X |
| 2,560,252 | 7/1951 | Schefe | 214/6(K)X |
| 2,764,408 | 9/1956 | Weiler | 271/12(X)X |
| 2,794,637 | 6/1957 | Rugg | 214/6(K)X |
| 2,843,061 | 7/1958 | Bonebrake | 214/6(D)X |
| 3,103,355 | 9/1963 | Hubbard et al. | 271/12X |
| 3,126,200 | 3/1964 | Rehm | 271/74X |
| 3,131,929 | 7/1961 | Rehm | 214/309X |
| 3,205,794 | 9/1965 | Califano et al. | 214/6(K)X |
| 3,443,706 | 5/1969 | Puhm | 214/6(D)X |
| 3,337,064 | 8/1967 | Mojden et al. | 214/7 |

FOREIGN PATENTS

| 914,468 | 1/1963 | Great Britain | 214/6(FS) |

*Primary Examiner*—Gerald M. Forlenza
*Assistant Examiner*—Robert J. Spar
*Attorney*—Olson, Trexler, Wolters and Bushnell

ABSTRACT: An article handling system for transferring relatively flat articles, such as can ends, from a first station wherein said articles are in stacked relation to a second station where the articles are restacked for processing by a testing machine, or the like, associated with said second station. The handling system includes transfer apparatus which unstacks and conveys individual can ends from the first station to a point where the can ends are restacked for use at the second station. This transfer apparatus includes a feeder arrangement which receives the can ends in stacked relationship, while permitting only one can end at a time to be unstacked and conveyed. In addition, the transfer apparatus may include means for restacking the individual can ends prior to processing at said second station.

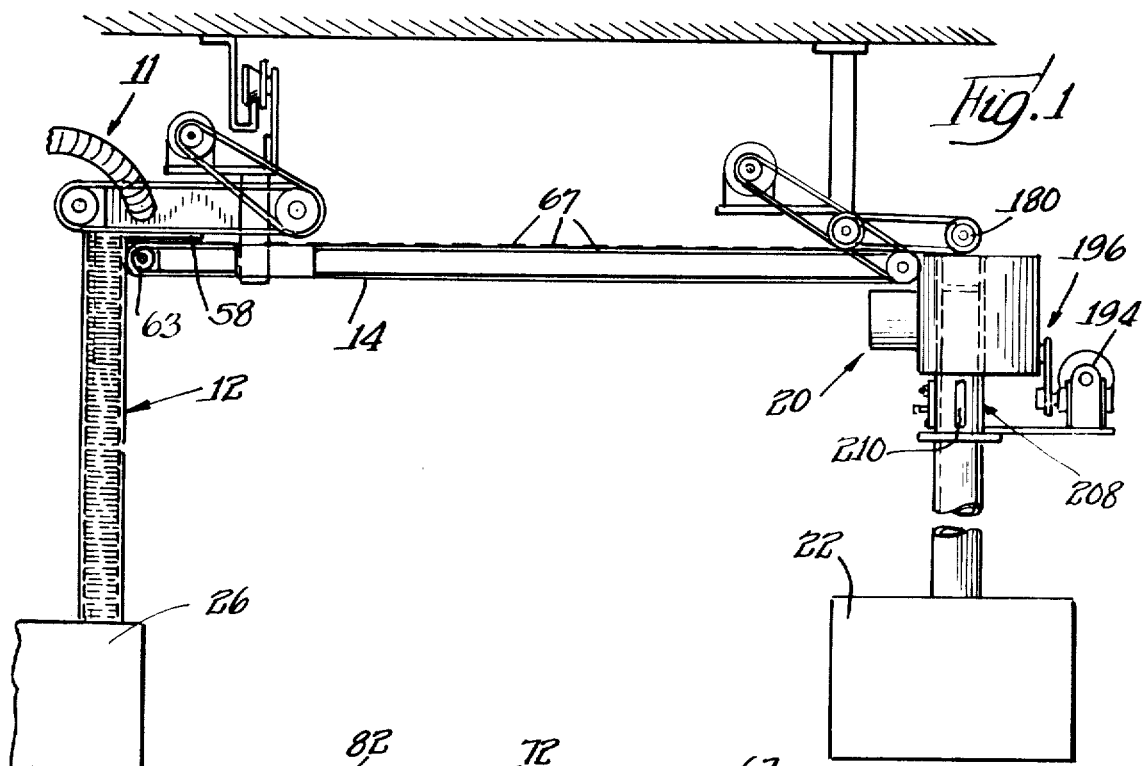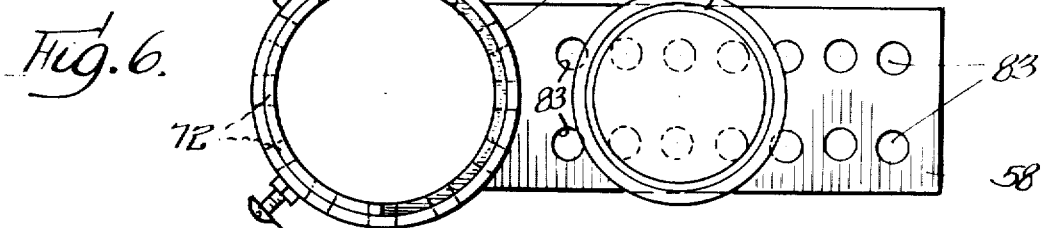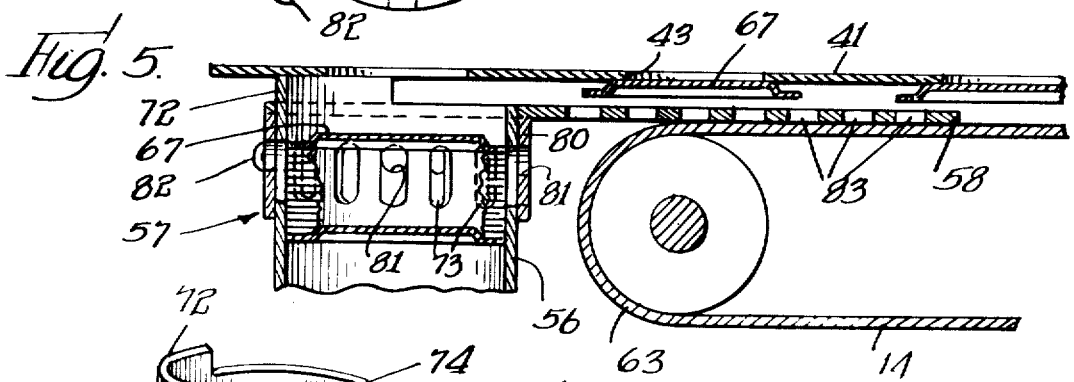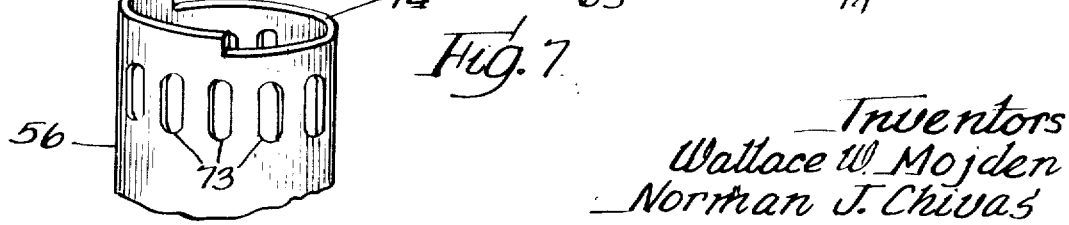

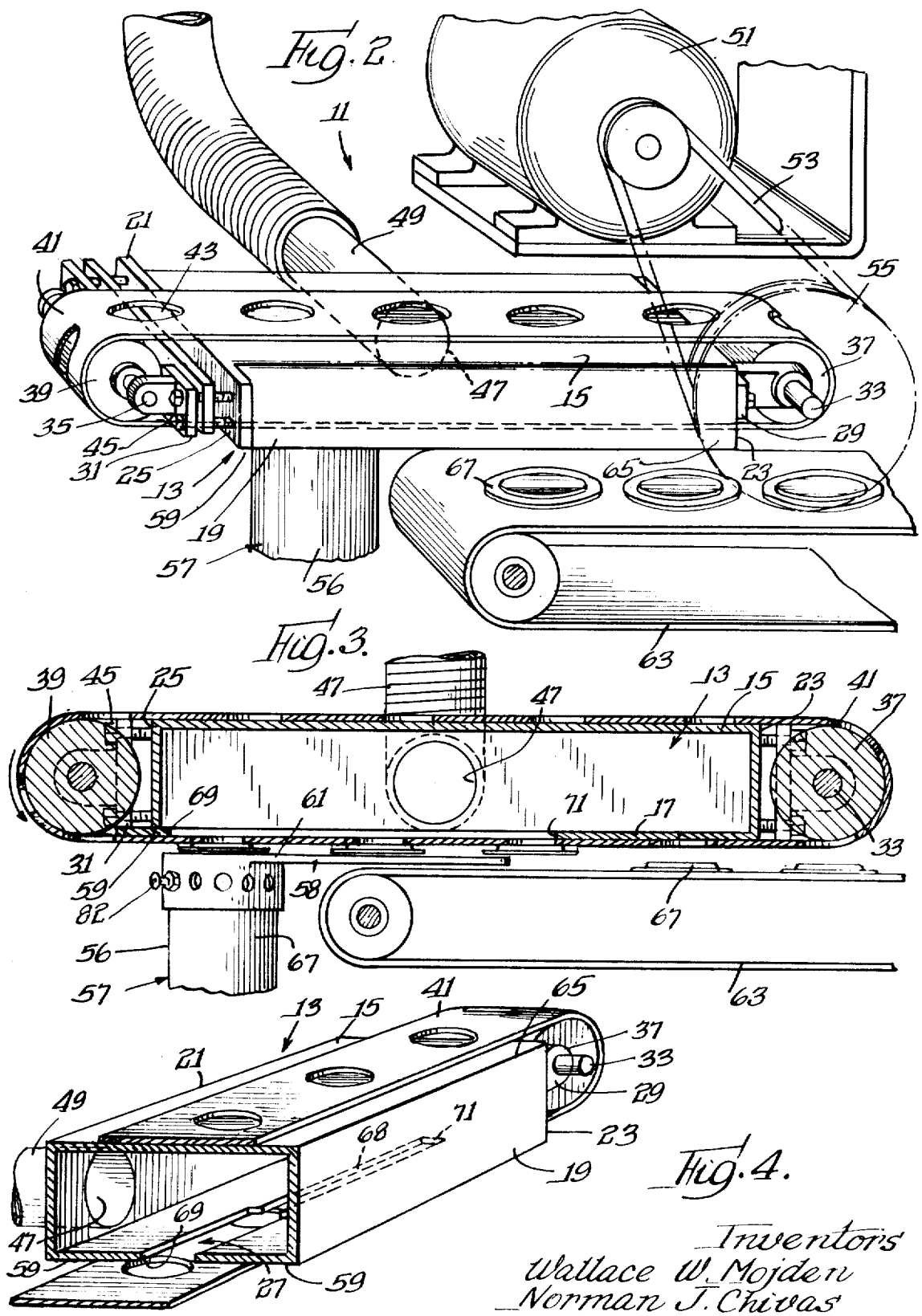

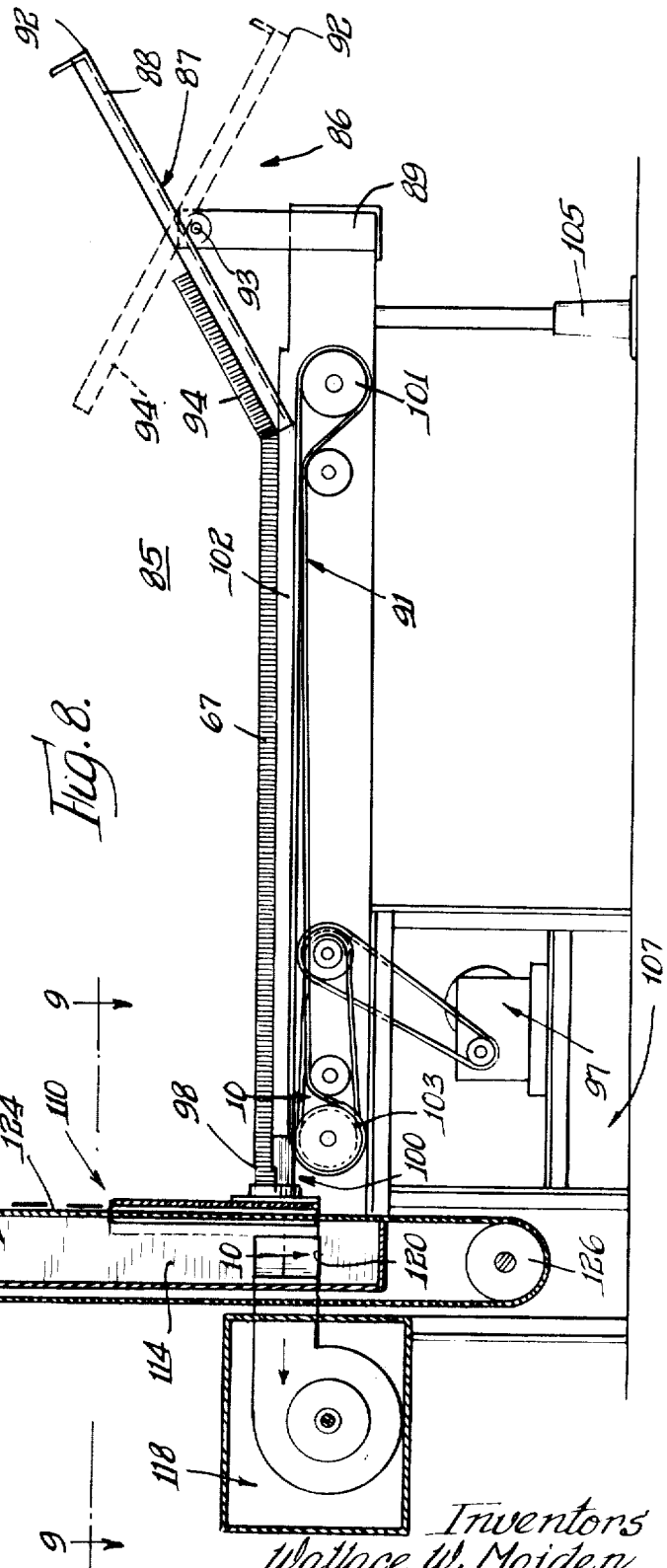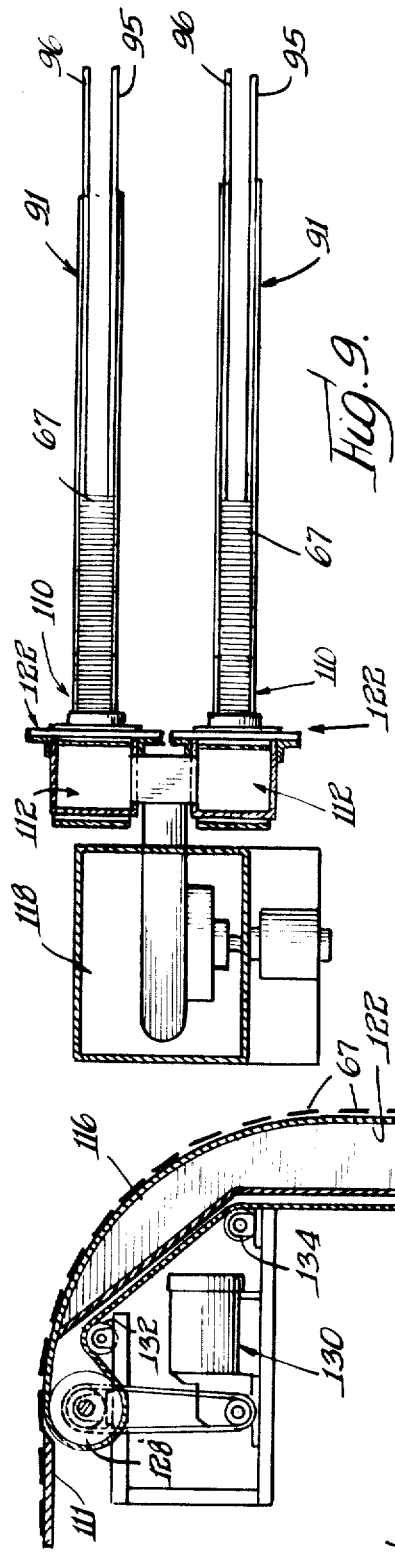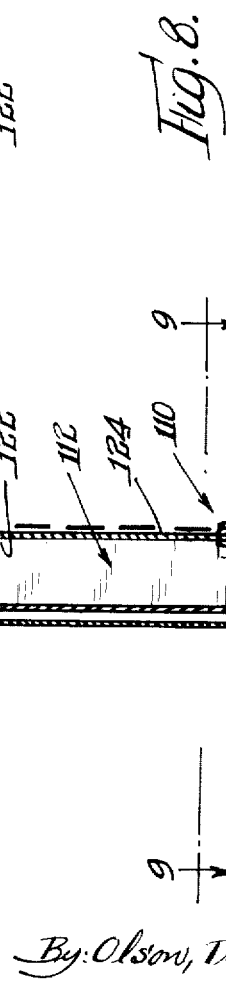

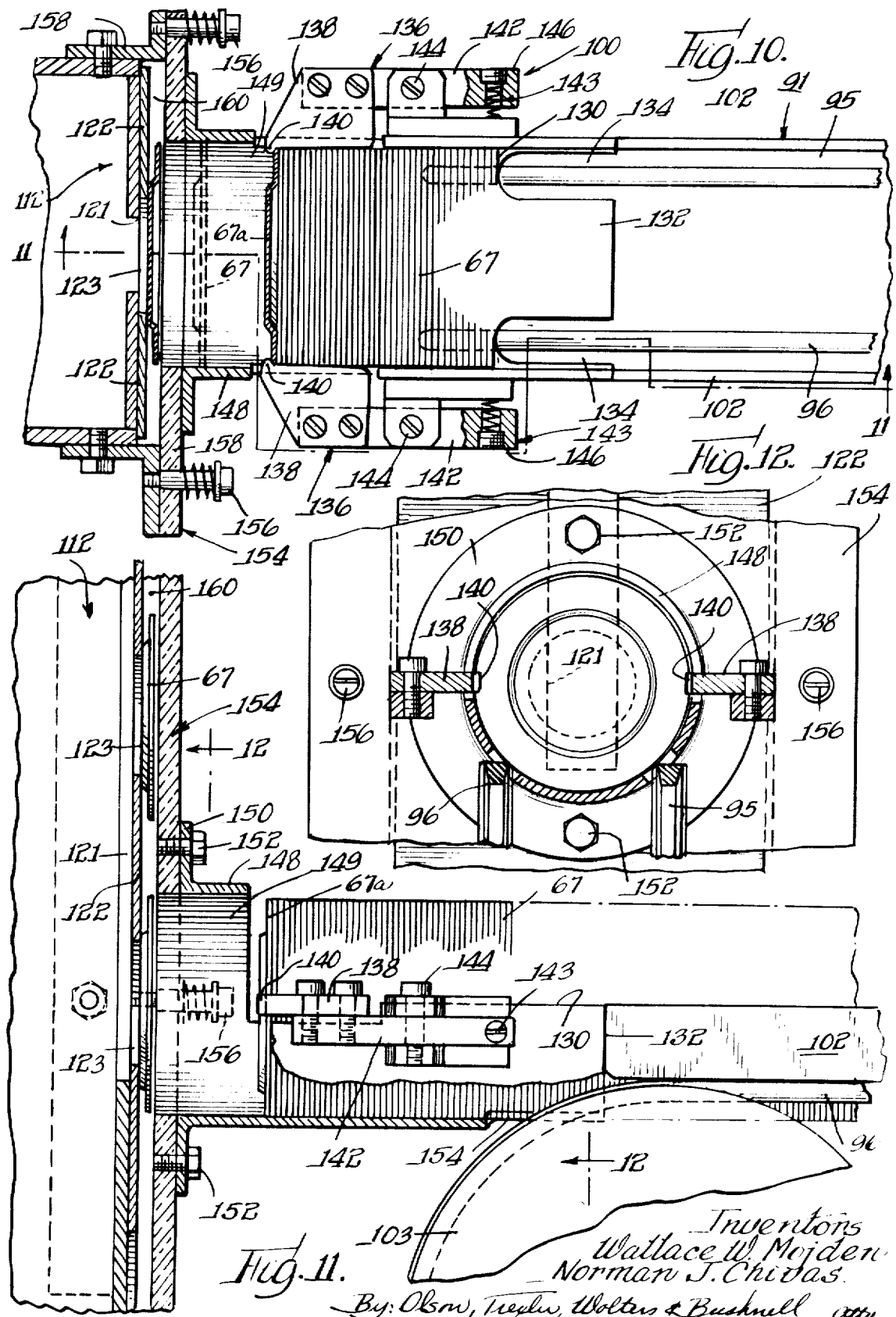

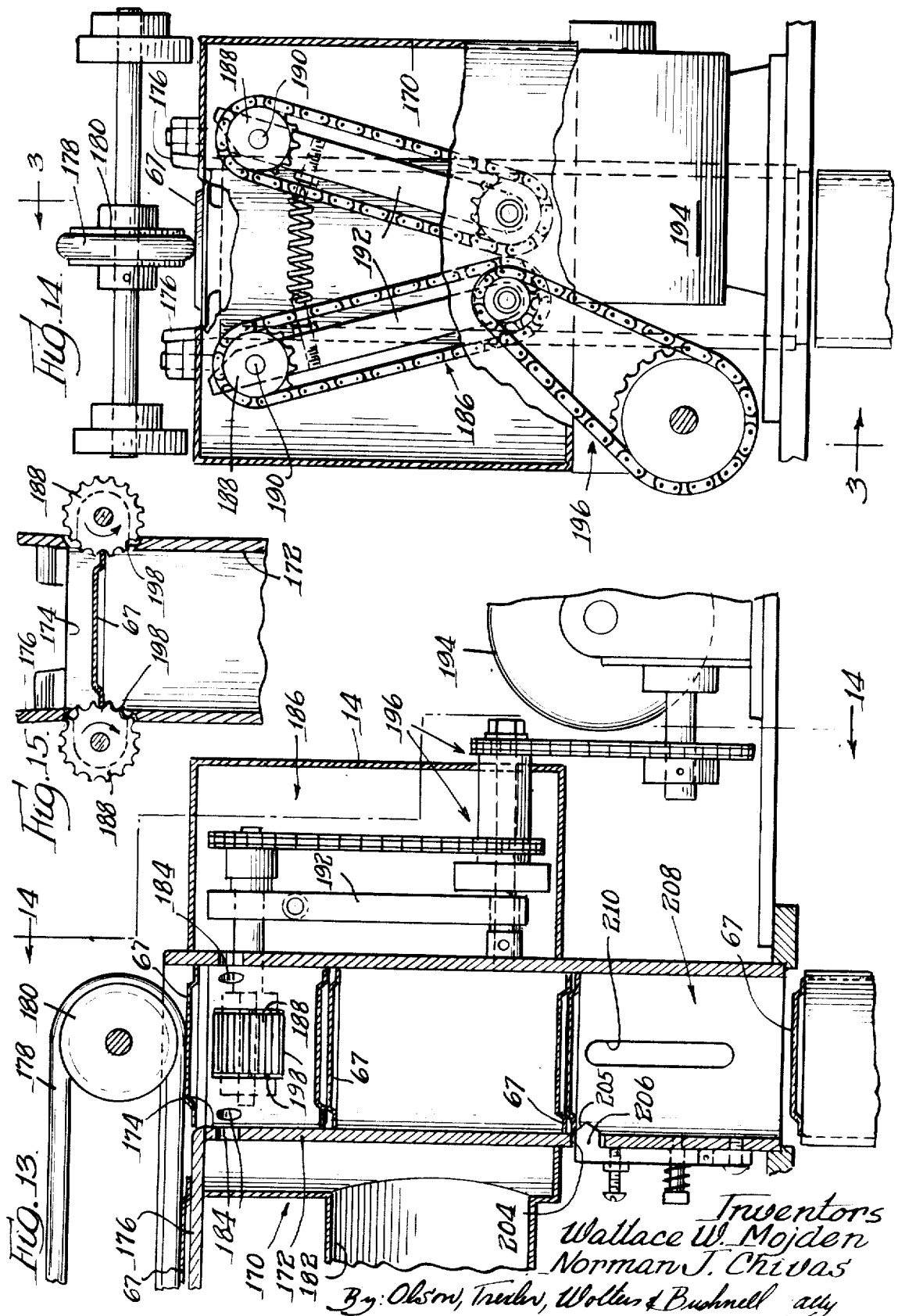

CAN END TRANSFER APPARATUS

CROSS-REFERENCE TO RELATED APPLICATIONS

The present application is a continuation-in-part of U.S. application for letters Pat. Ser. No. 703,303, Feb. 6, 1968 by applicants herein, now abandoned.

BACKGROUND OF THE INVENTION

This invention relates to apparatus for handling substantially flat articles and more particularly to apparatus for transferring can ends.

Can end or other flat article handling machines are well-known in the art. Transfer mechanisms used therein which carry can ends from a vertical or horizontal stack to a vertically or horizontally moving conveyor and vice versa are also known. Transfer mechanism incorporating mechanical means for engaging and separating articles from the ends of a stack have been used, but such devices present maintenance problems and also frequently cause scratches or other damage to the articles. To overcome this problem of scratching, etc., the portions engaging the articles to be transferred have been chrome-plated or formed from a plastic material. This, however, proves to be costly and thus raises the price of the mechanism.

SUMMARY OF THE INVENTION

Accordingly, it is a general object of this invention to provide new and improved apparatus for transferring articles.

It is a more specific object of this invention to provide transfer apparatus which is capable of handling can ends in an efficient, reliable manner without causing damage or injury to the can ends.

It is yet another object of this invention to provide transfer apparatus of the last-mentioned type which is able to transfer can ends vertically, horizontally or at any angle therebetween.

Still another object of the invention is the provision of apparatus employing novel features which enable the effective separation and transfer of individual can ends from a stack of said ends, for transfer to a processing station.

Briefly, the foregoing objects and advantages, as well as others which will be apparent to those skilled in the art, are realized by the provision of transfer apparatus for use in a system for transferring substantially flat can ends, said transfer apparatus conveying can ends from a first station wherein said ends are in stacked relationship to a second station, and comprising: can end receiving means adapted to be placed in association with said first station; a housing having an elongate slot formed in one wall thereof with a portion of said slot disposed approximate said can end receiving means, said housing adapted to be connected operably with air evacuation means for withdrawing air from said housing; conveyor belt means closely overlying said one wall of the housing and said elongate slot to pass between said housing and said can end receiving means, said conveyor belt means having a plurality of spaced apertures formed therein; whereby, upon registration of an aperture with said slot and said can end receiving means, air will be withdrawn from said can end receiving means, through said aperture and said slot, into the housing, said withdrawal of air creating a suction force which may be applied to said can end receiving means to draw a can end into engagement with said conveyor belt means; said can end receiving means including feeder apparatus for permitting only one can end at a time to be drawn into engagement with said conveyor belt means.

DESCRIPTION OF THE DRAWINGS

A better understanding of the present invention and its organization and construction may be had by referring to the description below in conjunction with the accompanying drawings wherein:

FIG. 1 is an overall schematic view of a can end handling system in which horizontally oriented transfer apparatus according to the invention is employed.

FIG. 2 is an enlarged perspective view of a specific portion of the transfer apparatus of FIG. 1.

FIG. 3 is a side section view of the transfer apparatus of FIG. 2 taken along the line 3—3 thereof.

FIG. 4 is a sectioned end perspective view of certain elements which comprise the transfer apparatus illustrated in FIGS. 1 and 2.

FIG. 5 is a side, partially sectioned view of a vertical can end feeder arrangement which comprises a portion of the apparatus of the present invention.

FIG. 6 is a plan view of the feeder arrangement of FIG. 5.

FIG. 7 is a perspective view of a tube portion of the feeder arrangement of FIGS. 5 and 6.

FIG. 8 is an elevational view, partially in section, of a portion of another can end handling system in which vertically oriented transfer apparatus according to the invention is employed.

FIG. 9 is a top plan view, partially in section, of the apparatus of FIG. 8 taken along the line 9—9 thereof.

FIG. 10 is an enlarged cross-sectional view of a horizontal can end feeder arrangement of the apparatus of FIGS. 8—12.

FIG. 11 is a cross-sectional view of the horizontal feeder arrangement of FIG. 10 taken along the line 11—11 thereof.

FIG. 12 is a cross-sectional view of the horizontal feeder arrangement of FIG. 11 taken along the line 12—12 thereof.

FIG. 13 is a sectional view of a power driven restacker, which may comprise a portion of the transfer apparatus of the embodiment of FIGS. 1—7 or that of FIGS. 8—12.

FIG. 14 is a sectional view taken along the line 14—14 of FIG. 13, in the direction indicated; and FIG. 15 is a partial sectional view taken along the line 15—15 of FIG. 13, in the direction indicated.

DETAILED DESCRIPTION

Referring now to the drawings more in detail, FIG. 1 thereof shows a can end handling system 10 using transfer apparatus 11, according to the present invention. This particular can end handling system is used to take can ends located in a vertically oriented stack 12 that have just been processed at a first work station by machine 26, and convey them by means of transfer apparatus 11 to a second processing station. The transfer apparatus 11 includes generally a horizontally moving conveyor arrangement 14 which carries the can ends to a motorized vacuum restacker 20. From restacker 20, the can ends may be fed to a water leak tester 22 and then to apparatus for application to can bodies. The system 10 shown in FIG. 1 thus is illustrative of a typical arrangement in which transfer apparatus according to the invention may be used, however, as will be apparent from the following various other modifications may be employed.

FIG. 2 of the drawings illustrates in a perspective view the transferring apparatus or mechanism 11 shown in use with one portion of the overall can end handling system 10 of FIG. 1 of the drawings. This portion or segment of apparatus 11 comprises a housing 13, here shown as a rectangularly shaped enclosure, having a top wall 15, a bottom wall 17, a pair of sidewalls 19 and 21, and a pair of endwalls 23 and 25. The bottom wall 17, as can best be seen in FIG. 4 of the drawings, has located therein an elongate slot or aperture 27 which, as will be noted, is wider at end 69 than at the other end 71 thereof. Attached to the endwalls 23 and 25 of the rectangularly shaped housing 13 are adjustable platform portions 29 and 31, respectively, upon which are mounted a pair of shafts 33 and 35 having thereon respective rotatable drums or pulleys 37 and 39. An endless belt 41, having therein fixedly spaced apertures such as 43, and being slightly larger in width than the width of the elongated slot 27 (at end 69 thereof), surrounds the housing portion 13 and is mounted for rotation thereabout on the rotatable pulleys 37 and 39. Because the platform portions 29 and 31 are adjustable toward or away from a respective endwall 23 and 25 of the housing portion 13, the belt 41 can be made taut on the pulleys 37 and 39. The tensioning of the belt by adjustable platform portions 29 and 31 is provided through screw portions such as 45 therein which when turned in a counterclockwise direction, as shown in the FIG., cause the platform portion to be moved away from the endwall to which it is attached. Likewise, if turned in the opposite direction, the belt will be loosened from the pulleys making it convenient to change belts when necessary. In the sidewall 21 there is located an aperture 47 into which is placed a tube 49 which in turn is connected to an evacuation apparatus (not shown) to create a vacuum within housing 13. The endless belt 41 is made to rotate by means of a motor 51 attached by a belt 53 to a wheel 55 mounted on axle 33; however, the belt may be driven in another suitable manner, if desired.

A vertical can end feeder arrangement 57 is located at one end 59 of the housing 13 beneath end 69 of the elongated aperture 27 therein. A vertically extending tube portion 56 of arrangement 57 is shaped to accommodate the circular can ends to be held therein, and, as shown in FIG. 3, a horizontally oriented plate 58 connected to the end 61 of the tube portion 56, extends therefrom substantially parallel to and in the direction of movement of the belt 41. The end 61 and plate 58 of the feeder arrangement 57, as can be seen in FIG. 3 of the drawings, are spaced relatively close to the moving belt 41.

While in practice the feeder arrangement 57 may be part of the processing machine 26, which represents the first work station, said arrangement 57 in conjunction with the tube portion 56—the structural details of which will be discussed thoroughly hereinafter—in effect comprise and should be viewed as a portion of the transfer apparatus of the present invention.

Briefly then, from their stacked relationship in feeder arrangement 57, the can ends 67 are destacked and conveyed to a point above conveyor 63 where they are released and deposited thereon. This destacking or removal operation is accomplished by means of the suction or pressure differential created in housing 12 which operates via slot 27 and apertures 43 to draw air into the can end receiving means defined in part by feeder arrangement 57 such that a can end 67 is forced upwardly into engagement with the moving belt 41. Due to the continued application of suction to an individual can end 67 along the entire length of slot 27, the can end will be carried to the end 71 thereof where the suction force is broken, and the can end is released to fall onto conveyor 63. As mentioned above, end 69 of slot 27, where the can ends 67 are picked up, is wider than the central portion 68 or end 71 of the slot where the can ends are already secured to the belt. This is desirable, since it requires a greater suction force to pick up the can ends than to retain them on the belt.

It will be noted that the apertures 43 in endless belt 41, referred to above, are smaller in area than the surface area of the can ends or articles in tube portion 56 which are to be carried by the belt. This is done so that a can end is not pulled through a respective aperture 43 into the housing by the vacuum created in the latter. The apertures in the belt are preferably but not necessarily the same or nearly the same shape as the articles to be transferred; thus, as shown in the drawings, if substantially circular can ends comprise the articles to be transferred, the apertures in the belt will likewise be substantially circular in shape with a slightly smaller diameter than the can ends.

Referring now specifically to FIG. 3 of the drawings, the platform portions 29 and 31 and their adjustable screw mechanisms, such as 45, can clearly be seen. Furthermore, it becomes obvious that belt 41, which circumvents housing 13 and is rotatable thereabout by means of pulleys 37 and 39, fits closely thereto so that the vacuum created by the evacuating means connected to tube member 49 may be utilized at its greatest efficiency. The moving conveyor 63, onto which can ends are transferred, can be seen carrying the can ends such as 67, which have been released from transfer mechanism 11 at the end 71 of elongated slot 27 thereof.

FIG. 4 of the drawings illustrates clearly the elongated aperture 27 in the base wall 17 of enclosed housing 13. The difference in width of the slot 27 at ends 69 and 71 thereof, respectively, is readily apparent in this figure. As can be seen, the vertical infeed tube portion 56 of arrangement 57 is located directly beneath the first end 69 of the elongated aperture 27 which in this embodiment of the transfer mechanism is substantially coincidental with the first end 59 of housing 13. The length of housing 13 is immaterial, and irrespective of the orientation of configuration of the overall system, the aforementioned relationships are maintained with respect to said elongate aperture, for the holding or pulling power of the transfer mechanism is provided only along the opening 27.

Referring now to FIGS. 5—7 of the drawings, there is shown the upper end 61 of the vertically oriented feeder arrangement 57. As mentioned above, the arrangement includes a plate 58 extending from the upper end 61 of the tube portion 56 parallel to and in the direction of movement of the belt 41.

The structure of the tubular portion 56, which enables the feeder arrangement, designated generally 57, to supply one can end at a time will now be discussed in detail. It should be noted that the stacked can ends 76 in tubular portion 56 are in tight engagement with each other, and due to this, as well as other factors such as static charges, these can ends will not always separate with ease. Accordingly, near the end 61 of the tube portion 56, there is provided a series of elongate holes or apertures 73 which permit streams of air to enter the tube portion 56 and in effect precludes the application of the vacuum or suction force below this point.

As the height of the can ends in said tube portion 56 increases the first can end will reach a position with its bottom edge slightly above the uppermost point of aperture 73. When this happens, it can be seen that a valving or blocking action takes place with respect to tube portion 56. Just prior to this point, the streams of air entering the tube portion 56 will do so substantially perpendicular to the axis thereof and are effective to lift and separate the individual can ends from each other; which action quite obviously is most effective on the uppermost can end. Thus, as soon as the uppermost can end 76 reaches the point illustrated, i.e. in substantially blocking relation to tube 56, it will be sucked or forced into engagement with the moving conveyor belt 41. In addition, since the uppermost can end 76 has been separated slightly from the next can end, only one of said can ends will be forced into engagement with belt 41, and once this can end engages said belt 41 in blocking relation with the aperture 43 the vacuum or suction force is no longer applied to tube 56. Accordingly, if there is any tendency to draw a second can end 76 upwardly, the application of the vacuum force will cease before the can end 76 clears the upper edge of the tube portion 56, and it will fall back onto the stack.

In order to control the amount of air being drawn into tube 56, a collar element 80 is rotatably mounted on the exterior of the tube 56. A plurality of circular apertures or openings 81 are formed in said collar element 80, such that upon assembly they are designed to be alined with apertures 73 in tube portion 56. The collar element 80 may be adjusted circumferentially with respect to tube 56, so that apertures 81 regulate the amount of air being drawn through apertures 73; the nut and bolt arrangement 82 being provided to maintain collar 80 in the desired position. This arrangement is useful when the size or particular shape of the can ends require more or less suction force to draw them into engagement with the moving belt, and it affords the operator a degree of control over this feature.

The plate 58 extends parallel to moving belt 41 and includes holes 83 therein. The plate 58 has been provided in case a can end fails to be securely held to the moving belt at tube portion 56, in that it will catch a can end in the event it falls prematurely from the belt. In addition, by allowing air to be pulled upwardly therethrough, the air holes 83 serve to give the can ends an additional boost to aid in their retention on belt 41.

As will be noted from FIG. 7, tube 56 has an arcuate lip portion 72 which extends above the remaining portion 74 thereof. This is done to insure the movement of the can ends from the vertical stack within tube portion 56 to the moving belt 41.

The high side or lip portion 72 serves to direct air being pulled upwardly by the evacuation means in the direction of movement of the belt 41, and thus the suction force is used most efficiently.

Looking now at FIG. 8 of the drawings, there is illustrated therein another can end handling system, designated generally 85, which employs a vertically oriented transfer mechanism 110, and comprises another embodiment of the invention. This can handling system 85 is used to transport can ends from a first station 86 to transfer apparatus or mechanism 110, and in turn to a horizontal plate or platform 111 at a vertically higher level, which, for purposes of description, may be viewed as a portion of a second work station (not shown) wherein the can ends are further processed or assembled to can bodies.

As will be noted, at station 86 there is located a can end loader 87 which includes a trough 88, pivotally mounted substantially at the center thereof to a support member 89 at the end of the horizontally moving belt arrangement 91 which delivers the can ends 67 to the vertically oriented transfer mechanism 110. In a first position (shown in dotted lines) an operator fills end 92 of the trough of loader 87 with can ends. After filling end 92, the operator tilts or pivots the trough loader 87 about point 93 such that the can ends slide along the trough and are delivered thereby to the belt conveyor arrangement 91.

The conveyor arrangement 91, as can be seen in FIG. 9 of the drawings, comprises a pair of belts 95 and 96 which engage the edges of the can ends to pull them from trough 87. A pair of parallel guide rails 102 cooperate with said belts to maintain the can ends 67 is position on the conveyor arrangement. Power for the conveyor arrangement 91 is provided by a drive system 97 which is operably associated with a pair of pulleys 101 and 103 over which the endless belts 95 and 96 are engaged. The entire system is supported by means of an adjustable leg 105 on one end thereof and by the transfer mechanism support frame 107 on the other end.

When the can ends 67 reach the end 98 of moving belt arrangement 91, they are fed by means of a horizontally oriented feeder arrangement or mechanism 100 to the transfer apparatus 110. The feeder arrangement 100 which will be described in more detail hereinafter, in effect comprises a portion of the transfer apparatus 110, in much the same manner and for generally the same purpose as discussed with regard to the structure of tube portion 56.

The transfer apparatus 110 is similar to transfer apparatus 11 of FIGS. 2—4 except that it is vertically oriented. The apparatus 110 includes an enclosure or housing 112, having a lower portion 114 which is shown as being rectangular in shape and extending vertically upwardly, and a turned or curved portion 116 which serves to carry the can ends to the horizontally oriented station 111. An air evacuation means 118, extending into the side 120 of housing 112, provides the suction required to pull can ends from the can end receiving means defined in part by the feeder arrangement 100, and from there to a moving belt 122 which circumvents the housing. The housing 112, as in the case of housing 13 of transfer apparatus 11, includes therein an elongated slot 121 (shown in FIG. 10), while the movable endless belt 122, like belt 41, includes therein spaced-apart apertures 123 (also shown in FIG. 10), which in conjunction with slot 121 enable can ends 67 to be drawn to belt 122 and carried thereby for depositing at station 111, or until engaged by some other type of conveyor apparatus, such as a magnetic roller or the like. The belt 122 is mounted on a pair of main pulleys 126 and 128; pulley 128 being driven by a motor and belt arrangement 130. A pair of auxiliary pulleys 132 and 134 serve as idlers to take up the slack and correctly orient the endless belt 122. The functioning of the transfer apparatus 110 is believed clear; and due to its similarity to that of apparatus 11, a detailed explanation thereof is deemed unnecessary, with the exception of the operation of feeder arrangement 100 which will follow.

FIG. 9 of the drawings illustrates a pair of transfer mechanisms 110 which are used together in a side-by-side relation. As will be noted, each mechanism 110 has a corresponding, separate conveyor arrangement 91 which brings can ends thereto from separate loaders such as 87 (not shown). An advantage of placing two transfer mechanisms in a side-by-side relation is that a common evacuation means 118 can then be used to supply the suction force used to hold the can ends to the apertured moving belts 122. As can be seen, the evacuation means 118 in FIG. 9 is connected to both housings 112 of the respective mechanisms 110.

Referring now to FIGS. 10—12 of the drawings, a more detailed description of the horizontally oriented feeder arrangement 100 will be given.

As best viewed in FIG. 10, the feeder arrangement 100 includes an entrance trough section 130 into which can ends 67 are delivered from belts 95 and 96. The trough section 130 is provided with lip member 132 formed by cutouts 134 into which belts 95 and 96, respectively, move to insure proper removal of the can ends 67 form the belts. For purposes of clarity, the pulley 103 and the other elements of the drive system 97 for said belts 95 and 96 are not shown in FIG. 10.

Mounted on either side of the trough section 130 is a spring-biased, pivoted gripping member 136. Each member 136 includes a front block portion 138, preferably of a nylon or the like material, having a small fingerlike protrusion 140 rigidly formed therewith and extending therefrom into trough section 130 for retarding engagement with the lead can end 67a. As can be seen in FIG. 12, the fingers 140 of respective block portions 138 are in an opposing relation to each other within trough section 130. Connected to the block portions 138 is a body portion 142 which is pivotally mounted near the center 144 thereof at the side of section 130 and fastened by means of a spring and screw arrangement 143 at the other end 146 thereof. The spring and screw arrangement 143 provides a force which keeps fingers 136 normally engaging a lead can end 67a, as shown in FIG. 10 of the drawings.

Just beyond the fingerlike protrusions 140 and extending from trough section 130 in the direction of the endless belt 122, is a short tubular portion 148, which is in alinement with the stacked can ends 67 and adapted to be alined with the apertures 123 in belt 122. A flange 150 of tubular portion 148 serves to attach the tubular portion 148 by means of bolts 152 to a plate 154 which extends upwardly therefrom in the direction of movement of belt 122.

The plate 154, as shown in FIG. 10, is fastened by means of spring-loaded screws 156 to bracket members 158 mounted to the sides of housing 112. As will be noted, the plate 154 is separated from the belt 122 by a space 160 to permit the movement of can ends 67 between the plate and housing. The spring-loaded screw mounting of plate 154 to housing 112 provides for the movement of the feeder arrangement 100 away from the housing without dismantling screws 156 in case a can end 67 becomes jammed at the end thereof. The plate 154 also serves to concentrate the vacuum provided by evacuation means 118, for a distance along housing 112 to insure the adherence of the can ends to the endless belt 122.

A brief discussion of the operation of feeder arrangement 100 will now be given.

As can be seen in FIGS. 10 and 11 of the drawings, the can ends are stacked horizontally along belts 95 and 96 and in trough section 130 of the feeder arrangement, with the opposing fingerlike protrusion 140 holding the lead can end 67a therebetween. As the belt 122 moves along housing 112, an aperture 123 in the former assumes a position coincident with the tubular portion 148 of the feeder arrangement. Due to evacuation means 118, a suction force is applied to tubular portion 148 by means of air being drawn from end 149 thereof into housing 112 via slot 121 and apertures 123 in belt 122. The force of the rushing air against the lead can end 67a and the force of the stack being pushed thereagainst is sufficient to overcome the force of fingers 140 gripping the can end and permit a single can end to be sucked through tubular portion 148 into engagement with belt 122 at aperture 123 therein. Because of the spring loading of gripping members 136 the fingers 140 immediately return to their original gripping position and engage the next can end of the stack which has been advanced by means of belts 95 and 96.

The gripping members 136, in addition to allowing for only one can end to be pulled to moving belt 122, also provide a means whereby the can ends of the horizontal can end stack are kept standing on edge and are prevented from tumbling or from being inclined as they pass through tubular portion 148.

In FIGS. 13—15 the motorized or powered restacker 20, shown in FIG. 1, is illustrated in detail. As will be recalled, the can end restacker 20 receives the can ends 76 from conveyor arrangement 14, and restacks them for supply to a leak tester 22, or some other device which further processes can ends.

Referring now in detail to FIG. 13, the restacker 20 includes an aerodynamic chamber or housing 170 which has a stacking tube or trough member 172 positioned therein. The stacking tube 172 is associated with the water leak tester 22 to supply can ends thereto. The housing or chamber 170 has a receiving opening 174 provided by the open end portion of tube 172, and is adapted to be connected with air evacuating means to facilitate the disposition of can ends in member 172, as will be detailed hereinafter.

A guide plate arrangement 176 is provided for directing can ends 76 into alinement with the receiving opening 174. The guide plate 176 is alined with the discharge end of conveyor 14 and receives the can ends 76 therefrom. To convey the can ends along the length of the guide plate arrangement 176, a driven belt 178 is provided. Belt 178 contacts the can ends 76 along the lower reach thereof and is engaged over roller 180 such that when driven by a motor or some other means (not shown), in the direction indicated, the can ends will be transported to a point in direct alinement with opening 174.

Housing 170 includes an outlet port or tube 182 which is associated with a high volume fan or some other form of air evacuation means, as mentioned previously. In addition, the upper portion of stacking tube 172 includes a plurality of apertures 184 disposed approximate the opening 174. With this arrangement, air will be drawn through said opening 174 into tube 172 and from there through apertures 184 into the outlet 182. Accordingly, as a can end 76 comes into alinement with aperture 174 the stream of air provided by the air evacuation means will force or pull the can end downwardly into tube portion 172.

To insure positive movement or travel of the can ends 76 along the length of stacking tube 172, can end drive means are provided, and designated generally 186. The can end drive means 186 include a pair of laterally spaced-apart, diametrically opposed gear members 188, best viewed with reference to FIG. 14. These gears 188 are mounted on spaced-apart shafts 190, each said shaft being carried by a pivotally mounted arm 192. By means of a motor 194 and various sprocket and chain drive means, designated generally 196, the shafts 190 and their associated gears 188 are driven or rotated in the direction indicated in FIG. 14.

A pair of slots or openings 198 are formed in the wall of the stacking tube 172 with the gears 188 partially received therein. The gears 188 include cogs or teeth 200 sized to receive can ends therebetween; and are resiliently biased toward each other by means of spring 202, with the teeth 200 protruding or extending into stacking tube 172.

The gears 188 are rotated continuously such that, upon the entry of a can end 76 into tube 172, the gears or cogs 188 will engage the periphery of said can end and force it axially inward of the tube into stacked relationship. The resilient biasing of the gears 188 provided by spring 202 permits the gears to adjust and handle the can ends without the danger of clogging or otherwise fouling the operation of the device.

The gears 188 are formed advantageously of plastic or a like material having some degree of resiliency so as not to bend or otherwise damage the can ends.

Since the maximum operating speed of a can end tester 22 may be greater than the rate at which can ends 76 are supplied to the stacking trough 172, a control arrangement may be provided to adjust the speed of said tester in accordance with the supply of can ends.

In this regard, a plurality of spring-biased catches 204 are mounted about the circumference of tube 172, each of which has an end 206 which includes a can surface 205. The respective ends 206 extend into said tube 172 through apertures 207. Accordingly, as the can ends are fed into said tube by the drive arrangement 186 they will engage and be retarded by catch ends 206 so as to preclude initially movement past said ends. As can be seen in FIG. 13, this retarding of the can ends 76 creates a gap in the overall stack of can ends in tube 172, which gap is designated a control gap, and indicated generally at 208. Quite obviously, as the drive apparatus continues to force can ends inwardly of the tube 172, the force placed on the can surfaces 205 of catches 204 will be sufficient to retract said catches and permit can ends to fall through the control gap into engagement with the stack positioned immediately therebelow. However, the rate at which the can ends fall through this gap is that at which ends are being supplied to the restacker 20.

Approximate the location of control gap 208, a pair of elongate slots 210 are formed in the wall of the stacking tube 172, which in effect define aperture means; only one of said slots 210 being visible in FIG. 13. A photoelectric control arrangement (not shown) is associated with the slots 210 to monitor the height of the stacked can ends 76 in the tube 172 with relation to said aperture means. The photoelectric device is operably connected with the speed control mechanism of tester 22, such that when a sufficient supply of can ends is available, i.e., control gap 208 being full, the tester 22 will operate at the maximum rate. If the supply of can ends drops below a selected level, however, the photoelectric device will automatically reduce the operating speed of tester 22, until the supply of can ends 76 is replenished. Also, if desired, additional control gaps, aperture means and photoelectric control devices may be employed to perform various monitoring and regulating functions. For example, if the level of can ends 76 in the stacking tube 172 falls below a minimum level, the tester itself may be deenergized; or a control arrangement of this type may be employed to regulate the speed of the transfer apparatus.

Other shaped can ends or the like articles may also be transferred with the transfer mechanism according to the invention with little or no modification thereof, and the length and size of the transfer mechanism is not limited to that shown in the drawings, for if desired or if necessary the mechanism may be made larger so as to be able to carry articles a greater distance. Furthermore, the embodiments of the transfer mechanism, which are shown in horizontally and vertically oriented positions, are not limited thereto. The transfer mechanism according to the invention may be used at virtually any angle between the horizontal and vertical equally as well.

It will be obvious to those skilled in the art that changes and modifications may be made without departing from this invention in its broadest aspects and therefore the aim of the appended claims is to cover all such changes and modifications as come within the true spirit and scope of the invention.

We claim:

1. In a system for transferring substantially flat articles, such as can ends, the combination of transfer apparatus for conveying articles from a first station wherein said articles are in stacked relationship to a second station and restacking means for receiving and restacking articles for processing at said second station, said transfer apparatus comprising: article receiving means adapted to be placed in association with said first station; a housing having an elongate slot formed in one wall thereof, with a portion of said slot disposed proximate said article receiving means, said housing adapted to be connected operatively with air evacuation means for withdrawing air from said housing; conveyor belt means closely overlying said one wall of the housing and said elongate slot to pass between said housing and said article receiving means, said conveyor belt means having a plurality of spaced apertures formed therein; whereby, upon registration of an aperture with said slot and said article receiving means, air will be withdrawn from said article receiving means, through said aperture and said slot, into the housing, said withdrawal of air creating a suction force which may be applied to said article receiving means to draw an article into engagement with said conveyor belt means; and supply means associated with said article receiving means and permitting only one article at a time to be drawn into engagement with said conveyor belt means, said supply means comprising, a tubular member which forms a segment of said article receiving means and has a discharge end portion within which articles are disposed immediately prior to being drawn into engagement with said conveyor belt means, and air inlet means formed in said tubular member adjacent the discharge end portion, such that said withdrawn air is initially drawn into said tubular member perpendicular to the longitudinal axis thereof to separate an article from the stack, and is then directed axially to force said article into engagement with said conveyor belt means.

2. The combination as defined in claim 1 wherein said air inlet means includes a plurality of apertures formed in said tubular member at circumferentially spaced points about the periphery thereof, such that a stream of air is drawn into said member through each said aperture.

3. The combination as defined in Claim 2 wherein said supply means further include a collar element rotatably disposed about the exterior of said tubular member, said collar element having a plurality of apertures formed therein which are alineable with said apertures in the tubular member, such that upon adjustment of the position of said collar element, the relative disposition of said respective apertures may be adjusted to control the streams of air drawn into said tubular member.

4. The combination as defined in claim 1 wherein said supply means further include a pair of gripping members associated with said tubular member, said gripping members being adapted to engage the stack of articles, such that air entering said tubular member in conjunction with the addition of articles to the stack will separate the first article from the stack and said gripping members to permit it to be drawn into engagement with said conveyor belt means.